Patented Oct. 26, 1943

2,333,004

UNITED STATES PATENT OFFICE 2,333,004

POWER UNIT MOUNTING FOR TANDEM ROLLERS

Carl F. Greiner and John F. Harrison, Springfield, Ohio, assignors to The Buffalo-Springfield Roller Co., Springfield, Ohio, a corporation of Ohio Application July 20, 1942, Serial No. 451,604

9 Claims. (Cl. 180—20)

Our invention is a novel power unit mounting for tandem road rollers or the like, and the principal object thereof is to provide a power unit consisting of the motor, internal combustion engine, radiator and L-shaped transmission mounted as a unit on a sub-frame readily adjustable on the main frame of the road roller or other vehicle, so that the bevel drive pinion of the power unit may be readily adjusted with respect to the ring gear mounted on the end of the drive roll of the road roller for the purpose of taking up wear between the drive pinion and the ring gear, also to allow for manufacturing variations, the use of the adjustable sub-frame carrying the engine and transmission in fixed relation providing a ready means whereby the above gear adjustment may be effected without disturbing the relation or angularity of the engine and transmission shafting of the unit, and whereby the adjustment of the sub-frame may be effected by loosening and tightening a minimum number of hold-down bolts which connect the sub-frame to the main frame.

Heretofore in tandem rollers or the like the engine and transmission have been separately mounted or bracketed to the main frame of the vehicle, and thus if it were possible to shift the angularity or position of the shaft carrying the bevel drive pinion, each of the hold-down bolts of the transmission had to be adjusted and moreover, after being so adjusted, it was then necessary to separately adjust the hold-down bolts for the engine to shift the latter so that the engine shaft and transmission shaft would remain in proper alignment after said shifting. Because of such separate engine and transmission mountings it was practically impossible to effect adjustment of the drive pinion shaft on the vehicle, and any adjustment between the bevel drive pinion and its ring gear was necessarily effected by axial adjustment of the drive roll towards or from the bevel drive pinion.

According to our invention, the engine, radiator and L-shaped transmission are mounted upon a rigid rectangular frame having hold-down bolts at the four corners thereof, each passing through holes in the contacting flanges of the sub-frame and main frame of the road roller, the holes for the bolts in the sub-frame and main frame being elongated slots disposed at right angles to each other respectively, to permit ample adjustment of the sub-frame, so that when it is desired to shift the power unit it is merely necessary to loosen the four hold-down bolts at the corners of the sub-frame, and move the sub-frame sufficiently to bring the bevel drive pinion into proper meshing relation with respect to the ring gear, and to then again tighten said bolts, the entire operation being readily and quickly performed with a minimum effort, and the adjustment in nowise effecting the relation of the shafting of the engine-transmission unit assembly.

We will explain the invention with reference to the accompanying drawings which illustrate one practical embodiment thereof, to enable others familiar with the art to adopt and use the same; and will summarize in the claims, the novel features of construction, and novel combinations of parts, for which protection is desired.

Figure 1:
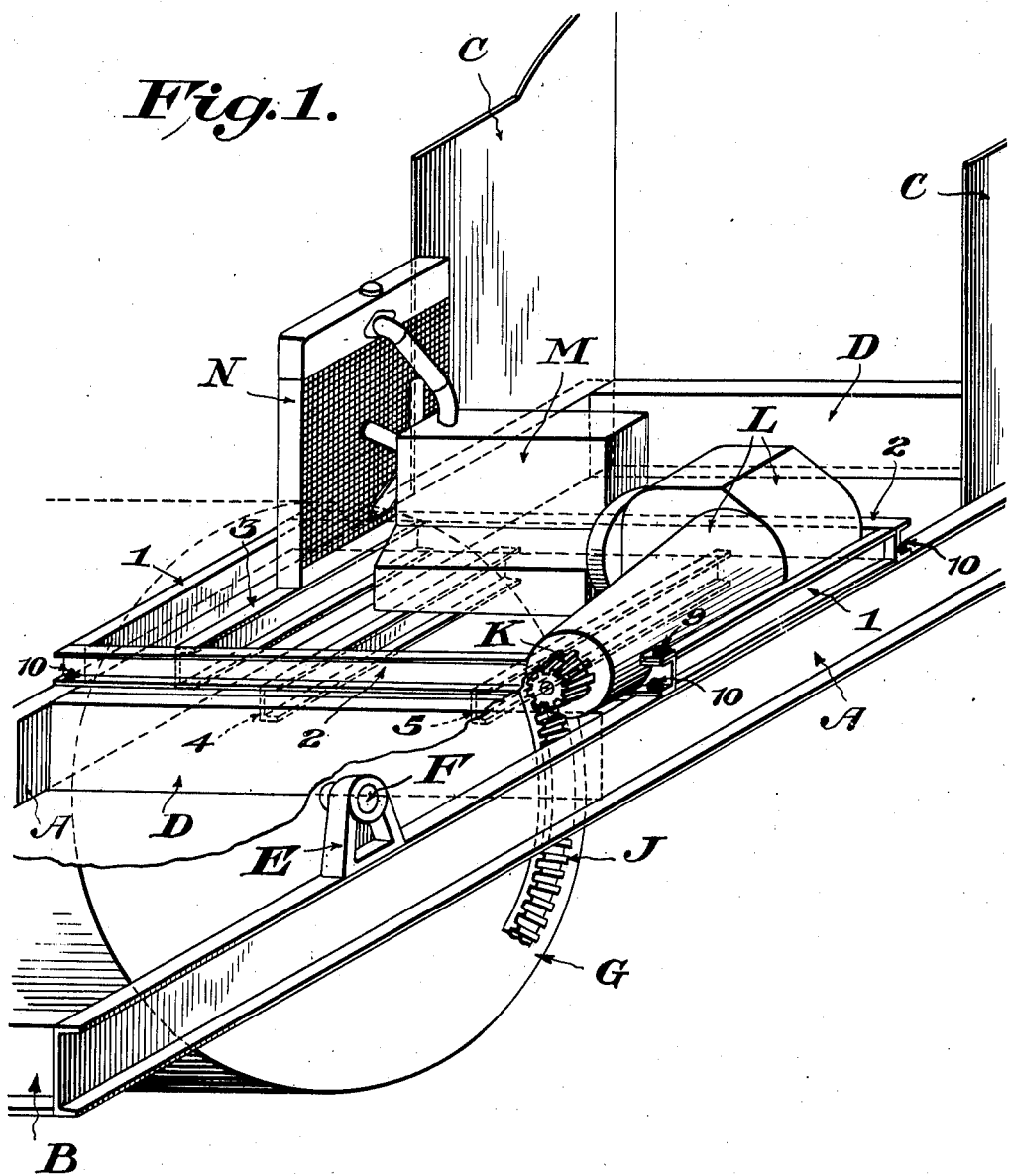
Fig. 1 is a perspective view, partly broken away, showing the rear portion of a tandem road roller provided with our novel power unit consisting of a radiator, engine, and L-shaped transmission mounted upon a sub-frame, and showing the sub-frame adjustably mounted upon the main frame of the road roller.

As shown in Fig. 1, the tandem roller preferably consists of a main frame including parallel side members A, A which may be heavy channel irons connected at their rear ends by a similar transverse member B. At the front ends of the side members A, A, are plates C connected with or forming part of a goose-neck (not shown) at the front end of the roller which carries the trunnion for the front steering roll (not shown). The side members A, A may be connected together intermediate their ends by transverse members D in order to impart rigidity to the main frame. Adjacent the rear ends of the side members A, A are opposed bearing blocks E for the axle F of the drive roll G. On one end of drive roll G is a large beveled ring gear J meshing directly with bevel drive pinion K of the L-shaped transmission L, drive pinion K imparting rotation to the drive roll G to move the vehicle in either direction. Transmission L is driven by an internal combustion engine M, having a radiator N, the axis of the engine being transverse to the longitudinal axis of the main frame of the road roller. The details of the motor M and of the L-shaped transmission L however, form no part of our present invention.

Our invention consists in providing a sub-frame seated upon the side members A, A of the main roller frame, which sub-frame is directly bolted thereto in such manner that same is readily adjustable thereon as a unit, whereby the radiator, engine, and transmission may be shifted as a unit on the main frame to maintain the drive pinion K properly engaged and in mesh with the ring gear J.

Figure 2:
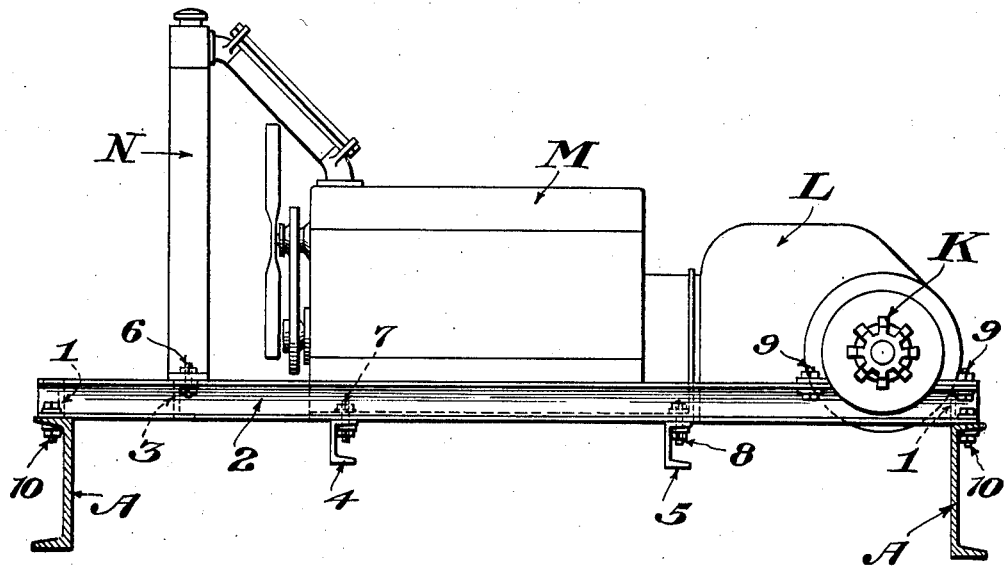
Fig. 2 is an elevation showing the means for mounting the radiator, engine, and transmission in the sub-frame, and showing the sub-frame resting on the main frame.

As shown, the sub-frame consists of parallel side members 1 adapted to directly overlie side members A, A of the main frame, the member 1 preferably consisting of channel irons of smaller size than the channels A. The ends of side members 1 are rigidly secured by welding or the like, to end members 2, and intermediate the side members 1 are channel irons 3, 4 and 5, having their ends rigidly secured to the end members 2—2, whereby the members 1—5 inclusive will form a rigid open frame capable of supporting the radiator N, engine M, and transmission L as a unit, as shown in Fig. 2.

Channel iron 3 is disposed adjacent one side of the sub-frame and forms a support for the radiator N which is bolted thereto as at 6 or secured thereto in any other desired manner, while channel irons 4 and 5 and the adjacent side member 1 support the engine-transmission assembly M—L, and receive the hold-down bolts 7, 8 and 9 of the engine-transmission assembly M—L which latter may be immovably or unadjustably mounted in the sub-frame.

Figure 3:
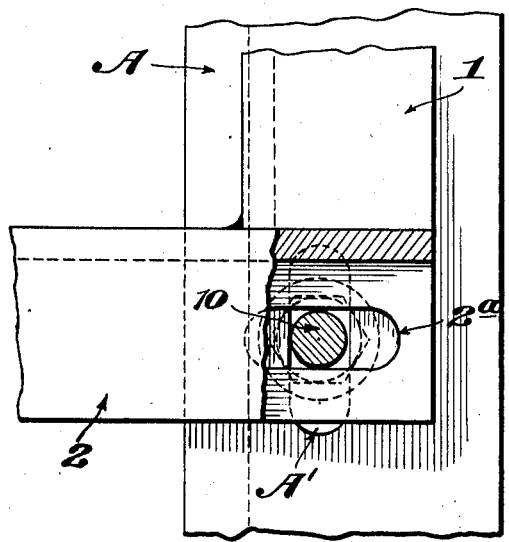
Fig. 3 is an enlarged plan view, partly broken away, showing the arrangement of the slots in the sub-frame and main frame which receive the hold-down bolts at each corner of the sub-frame.

As shown in Fig. 3, the lower flange of each end member 2, at each corner of the sub-frame, is provided with a slot 2a elongated in the direction of the flange and overlying a slot A′ in the upper flange of the underlying side member A of the main frame, which slot A′ is preferably elongated in the direction of its flange so that its axis will be disposed substantially 90° to the axis of slot 2a in the sub-frame member 2. Bolts 10 pass through the registering slots 2a and A′ and carry nuts whereby the sub-frame 1—5 is adjustably secured to the side members A of the main frame, loosening of the bolts 10 permitting the sub-frame to be moved longitudinally or transversely of the main frame throughout the limits of the registering slots 2a and A′.

By the above construction, when it is desired to adjust the bevel drive pinion K with respect to ring gear J, to take up wear or to compensate for manufacturing variations, it is merely necessary to loosen the four bolts 10 at the corners of the sub-frame 1—5 and then shift the frame so as to bring the drive pinion K rigidly carried thereon into proper mesh with respect to ring gear J, and then tighten said bolts. Thus, the adjustment may be quickly effected without disturbing the alignment of the shafts of the engine-transmission assembly M—L, thereby obviating the necessity for individually moving or adjusting the engine M, transmission L, or both.

The use of our sub-frame furthermore facilitates assembly of the machine, since the sub-frame with the radiator N, engine M and transmission L mounted thereon may be assembled at a point distant from the assembly of the remaining parts of the road roller, and the sub-frame later positioned and bolted down as a unit upon the main frame of the road roller, the adjustment between the gears J, K being effected at the time the sub-frame is thus mounted on the road roller.

We do not limit our invention to the exact form shown in the drawings, for obviously changes may be made therein within the scope of the claims.

We claim:

1. In combination with a vehicle having main frame members and having a drive roll journaled therein provided with a bevel ring gear; a power unit comprising a sub-frame, an engine-transmission assembly mounted on the sub-frame, said transmission including a bevel drive pinion meshing with said ring gear, and means for adjustably mounting the sub-frame on the main frame to position the pinion laterally and radially with respect to the ring gear.

2. In combination with a vehicle having main frame members and having a drive roll journaled therein provided with a bevel ring gear; a power unit comprising a sub-frame, an engine-transmission assembly mounted on the sub-frame, said transmission including a bevel drive pinion meshing with said ring gear, and means for adjustably mounting the sub-frame on the main frame to position the pinion with respect to the ring gear, said sub-frame comprising a rigid frame overlying members of the main frame; and said mounting means comprising bolts passing through registering elongated slots in the sub-frame and main frame members, said registering slots having their respective axes disposed at different angles thereby permitting the sub-frame to be shifted longitudinally and transversely of the main frame.

3. In combination with a vehicle having main frame members and having a drive roll journaled therein provided with a bevel ring gear at one end thereof; a power unit comprising a sub-frame, an engine-transmission assembly mounted on the sub-frame, said transmission including a bevel drive pinion meshing with said ring gear; and means for adjustably mounting the sub-frame on the main frame to position the pinion laterally and radially with respect to the ring gear.

4. In combination with a vehicle having main frame members and having a drive roll journaled therein provided with a bevel ring gear at one end thereof; a power unit comprising a sub-frame, an engine-transmission assembly mounted on the sub-frame, said transmission including a bevel drive pinion meshing with said ring gear; and means for adjustably mounting the sub-frame on the main frame to position the pinion with respect to the ring gear, said sub-frame comprising a rigid frame having corners overlying members of the main frame; and said mounting means comprising bolts at the corners of the sub-frame passing through registering elongated slots in the sub-frame and main frame members, said registering slots having their respective axes disposed at right angles to each other, thereby permitting the sub-frame to be shifted longitudinally and transversely of the main frame.

5. In combination with a vehicle having main side frame members and having a drive roll journaled therein provided with a bevel ring gear at one end thereof; a power unit comprising a rigid sub-frame having side members overlying the main side frame members, and end members rigidly connecting the side members, an engine-transmission assembly mounted on the sub-frame, said transmission including a bevel drive pinion meshing with said ring gear; and means for adjustably mounting the sub-frame on the main frame to position the pinion laterally and radially with respect to the ring gear.

6. In combination with a vehicle having main side frame members and having a drive roll journaled therein provided with a bevel ring gear at one end thereof; a power unit comprising a rigid sub-frame having side members overlying the main side frame members, and end members rigidly connecting the side members, an engine-transmission assembly mounted on the sub-frame, said transmission including a bevel drive pinion meshing with said ring gear; and means for adjustably mounting the sub-frame on the main frame to position the pinion with respect to the ring gear, said mounting means comprising bolts at the corners of the sub-frame passing through registering elongated slots in the end members of the sub-frame and main side frame members, said registering slots having their axes disposed longitudinally of their respective members, thereby permitting the sub-frame to be shifted longitudinally and transversely of the main frame.

7. In combination with a vehicle having main side frame members and having a drive roll journaled therein provided with a bevel ring gear at one end thereof; a power unit comprising a rigid sub-frame having side members overlying the main side frame members, and end members rigidly connecting the side members, an engine-transmission assembly mounted on the sub-frame, said transmission including a bevel drive pinion meshing with said ring gear; and means for adjustably mounting the sub-frame on the main frame to position the pinion with respect to the ring gear, said mounting means comprising bolts at the corners of the sub-frame passing through registering elongated slots in the sub-frame and main frame members, said registering slots having their respective axes disposed at right angles to each other permitting the sub-frame to be shifted longitudinally and transversely of the main frame.

8. A power unit for vehicles having a bevel ring gear drive and having a main frame, comprising a sub-frame, an engine-transmission assembly mounted on the sub-frame, said transmission including a bevel drive pinion adapted to mesh with said ring gear; and means for adjustably mounting the sub-frame on the main frame to position the pinion laterally and radially with respect to the ring gear.

9. A power unit for vehicles having a bevel ring gear drive and having a main frame, comprising a sub-frame, an engine-transmission assembly mounted on the sub-frame, said transmission including a bevel drive pinion adapted to mesh with said ring gear; and means for adjustably mounting the sub-frame on the main frame to position the pinion with respect to the ring gear, said sub-frame having its corners adapted to overlie members of the main frame; and said positioning means comprising bolts at the corners of the sub-frame passing through registering elongated slots in the sub-frame and main frame members, said registering slots having their respective axes disposed at right angles to each other to permit the sub-frame to be shifted longitudinally and transversely of the main frame.

CARL F. GREINER.
JOHN F. HARRISON.